W. F. KOCH.
MICROMETER.
APPLICATION FILED JUNE 27, 1917.

1,254,607.

Patented Jan. 22, 1918.

WITNESSES
Frederick Diehl.
B. Joffe

INVENTOR
W. F. Koch
BY
ATTORNEYS

UNITED STATES PATENT OFFICE.

WILLIAM F. KOCH, OF BROOKLYN, NEW YORK.

MICROMETER.

1,254,607.                    Specification of Letters Patent.     Patented Jan. 22, 1918.

Application filed June 27, 1917.   Serial No. 177,257.

*To all whom it may concern:*

Be it known that I, WILLIAM F. KOCH, a citizen of the United States, and a resident of the city of New York, borough of Brooklyn, in the county of Kings and State of New York, have invented a new and Improved Micrometer, of which the following is a full, clear, and exact description.

My invention relates to micrometers, and has reference more particularly to the micrometer scale.

An object of the invention is to provide a combination metric and English scale for micrometers so that conversion from one to the other can be made quickly and accurately, as required in micrometric measurements.

Another object of the invention is to provide a micrometer which can be used with either system of measurement.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in the views.

Figure 1:
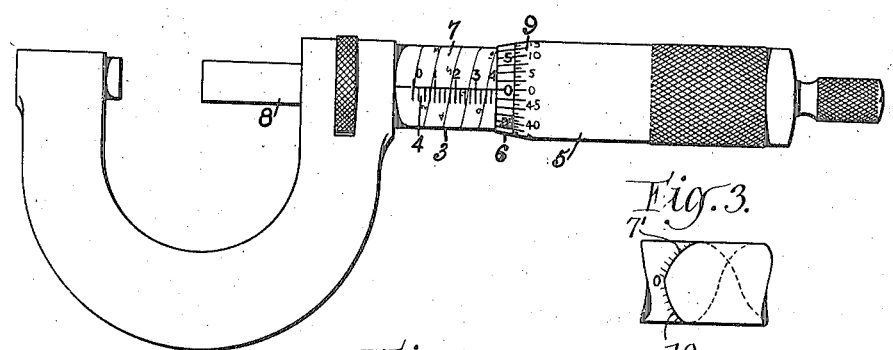
Figure 1 is an elevation of a micrometer provided with scales embodying my invention.

Referring to the drawings, the sleeve 3 has the ordinary longitudinal scale 4, which is in fractions of an inch when it is primarily designed for use with the English system. The thimble or barrel 5 has also a scale 6 corresponding with the scale 4.

To utilize such a micrometer in conjunction with the metric system, I provide a scale 7 on the sleeve 3, which scale is disposed along a spiral running on the barrel, the zero of the spiral scale coinciding with the zero of the longitudinal or straight scale 4. The pitch of the spiral scale 7 depends on the pitch of the screw on the spindle 8, therefore the number of threads per inch of sight line on the sleeve is equal to $$\frac{d(c-b)}{b};$$

where $d$ equals pitch of screw, forty threads per inch, as commonly utilized in the English micrometers; $c$, lead of screw in millimeters equals .635001; $b$, .01 of a millimeter divisions on scale 9 of the barrel 5, said scale running alongside the scale 6 on the barrel. There are fifty of such divisions on the barrel as will be noted; therefore $b$ equals .50. By substitution, the number of threads per inch of sight line will be equal to 10.80008. The spiral line is then divided and numbered successively, only the entire units being shown on the scale, the half millimeters being indicated by short lines.

Figure 2:
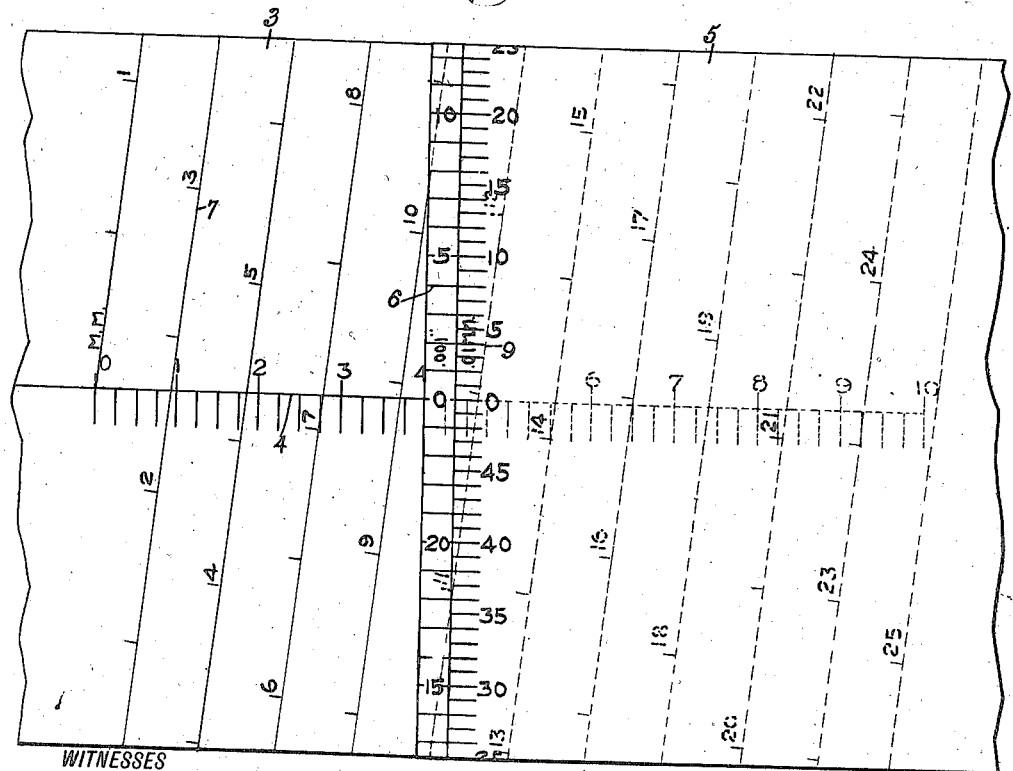
Fig. 2 is the developed scale on the sleeve and barrel of the micrometer.

Any reading taken on either of the scales 7 or 4 by the barrel or thimble 5 will give a corresponding reading on the other scale, thereby automatically performing the conversion from one system of measurement to the other. For example, as shown in Fig. 2, the reading on the micrometer on the English scale is .40 of an inch; on the metric scale the reading is 10.16.

It is evident that in cases where the micrometer has a straight scale of the metric system, that is to say, the thread for the thimble is a metric thread, then the spiral scale will carry the divisions of a scale of the English system. It may be further remarked that it is not necessary to provide two scales on the thimble, but it is to advantage, for the divisions of the metric scale may be made finer, that is, to be read to a greater fraction than that of the English system.

Figure 3:
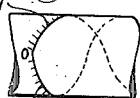
Fig. 3 shows the sleeve provided with spiral scales of the metric and English systems.

In Fig. 3 the spiral scale 7' of the metric system is of a coarser pitch. In consequence the English scale will not be in a straight line but on a spiral line 10 running in an opposite direction to the spiral 7'.

While I have described the principle of operation, together with the device which I now consider to be the best embodiment thereof, I desire to have it understood that the device shown is merely illustrative and that such changes may be made as are within the scope of the appended claims.

I claim:

1. In a micrometer, a sleeve having linear scales of the English and metric systems, one of said scales being disposed on a straight line parallel to the elements forming the surface of the sleeve and the other of said scales being disposed on a spiral about the surface of the sleeve, the zeros of said scales coinciding, a thimble movable over the sleeve longitudinally and revolubly and having a linear scale formed about the circumference of said thimble, and means for moving the thimble so that its longitudinal movement is proportional to its rotary movement, said last mentioned scale being adapted to coöperate with the scales on the sleeve.

2. In a micrometer, a sleeve having linear scales of the English and metric systems, the English scale being disposed on a straight line running parallel to the axis of the sleeve and the metric scale on a spiral, the zeros of said scales coinciding, a thimble movable over the sleeve, longitudinally and revolubly, means for moving the thimble so that its longitudinal movement is proportional to its rotary movement, and a scale about the circumference of said thimble disposed to coöperate with the scales on the sleeve.

3. In a micrometer, a sleeve, linear scales of the English and metric systems on said sleeve, one of said scales being disposed on a straight line parallel to the axis of the sleeve and the other on a spiral, the two scales originating from a common point, a thimble movable over the sleeve, longitudinally and revolubly, means for moving the thimble so that its longitudinal movement is proportional to its rotary movement, the pitch of the spiral scale bearing a predetermined relation to the movement of the thimble over the sleeve, and a scale or scales about the circumference of the thimble disposed to coöperate with the scales on the sleeve.

WILLIAM F. KOCH.